United States Patent
Liu

(10) Patent No.: US 9,392,529 B2
(45) Date of Patent: Jul. 12, 2016

(54) METHOD AND DEVICE FOR SELECTING SERVING GATEWAY ENTITY

(71) Applicant: HUAWEI TECHNOLOGIES CO., LTD., Shenzhen (CN)

(72) Inventor: Huiyong Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 13/928,909

(22) Filed: Jun. 27, 2013

(65) Prior Publication Data

US 2013/0286821 A1 Oct. 31, 2013

Related U.S. Application Data

(63) Continuation of application No. PCT/CN2011/083544, filed on Dec. 6, 2011.

(30) Foreign Application Priority Data

Dec. 31, 2010 (CN) .......................... 2010 1 0623225

(51) Int. Cl.
*H04W 48/04* (2009.01)
*H04W 72/04* (2009.01)
*H04W 88/16* (2009.01)
(Continued)

(52) U.S. Cl.
CPC .............. *H04W 48/04* (2013.01); *H04W 48/17* (2013.01); *H04W 88/16* (2013.01); *H04L 41/0668* (2013.01); *H04L 45/28* (2013.01); *H04W 64/00* (2013.01); *H04W 74/004* (2013.01)

(58) Field of Classification Search
None
See application file for complete search history.

(56) References Cited

U.S. PATENT DOCUMENTS 7,295,511 B2 * 11/2007 Sharma ............... H04L 12/5602
370/217
7,388,855 B2 * 6/2008 Madour ............ H04L 29/12311
370/231
(Continued)

FOREIGN PATENT DOCUMENTS

CN 101651608 A 2/2010
CN 101730124 A 6/2010
(Continued)

OTHER PUBLICATIONS

European Search Report issued Dec. 17, 2014 in corresponding European Patent Application No. 11 853 394.2.
(Continued)

*Primary Examiner* — Candal Elpenord
(74) *Attorney, Agent, or Firm* — Staas & Halsey LLP

(57) ABSTRACT

Embodiments of the present invention pertain to the communication field and disclose a method and device for selecting a serving gateway entity. The method includes: receiving an access request message of a user equipment UE sent by a base station, where the access request message includes location information of the base station; acquiring, according to the location information of the base station, a signaling plane address list of serving gateway entities SGWs serving the UE; and selecting, according to failure information of paths between the SGWs and neighboring network elements of the SGWs and the acquired signaling plane address list of SGWs serving the UE, an SGW having no failed path to a neighboring network element of the SGW to serve the UE. The device includes: a receiving module, an acquiring module, and a selecting module.

6 Claims, 7 Drawing Sheets

---

Receive an access request message of a UE sent by a base station, where the access request message includes location information of the base station — 101

▼

Acquire, according to the location information of the base station, a signaling plane address list of SGWs serving the UE — 102

▼

Select, according to failure information of paths between the SGWs and neighboring network elements of the SGWs and the acquired signaling plane address list of the SGWs serving the UE, an SGW having no failed path to a neighboring network element of the SGW to serve the UE — 103

(51) Int. Cl.
  *H04W 48/00* (2009.01)
  *H04L 12/24* (2006.01)
  *H04L 12/703* (2013.01)
  *H04W 64/00* (2009.01)
  *H04W 74/00* (2009.01)

(56) References Cited

U.S. PATENT DOCUMENTS

| | | | |
|---|---|---|---|
| 7,724,648 B2* | 5/2010 | Knop | H04L 41/0806 370/216 |
| 8,325,740 B2* | 12/2012 | Kok | H04M 3/12 370/218 |
| 2004/0032865 A1 | 2/2004 | Kwon | |
| 2004/0095881 A1* | 5/2004 | Borella | H04L 12/5602 370/219 |
| 2010/0002633 A1 | 1/2010 | Nishida et al. | |
| 2010/0061226 A1 | 3/2010 | Morishige et al. | |
| 2012/0002537 A1* | 1/2012 | Bao | H04W 24/04 370/221 |

FOREIGN PATENT DOCUMENTS

| | | |
|---|---|---|
| CN | 101772058 A | 7/2010 |
| CN | 101772114 A | 7/2010 |
| CN | 101827357 A | 9/2010 |
| CN | 102137487 A | 7/2011 |
| EP | 2648466 A1 | 10/2013 |
| JP | 2009-278297 | 11/2009 |
| JP | 2010-63022 | 3/2010 |
| JP | 2010-166543 | 7/2010 |
| WO | WO 2008/081924 A1 | 7/2008 |
| WO | 2009/000124 A1 | 12/2008 |
| WO | 2010/102127 A1 | 9/2010 |
| WO | WO 2010/124740 A1 | 11/2010 |

OTHER PUBLICATIONS

International Search Report mailed Mar. 15, 2012 in corresponding International Application No. PCT/CN2011/083544.
Japanese Office Action mailed Jun. 24, 2014, in corresponding Japanese Patent Application No. 2013-546573.

* cited by examiner

METHOD AND DEVICE FOR SELECTING SERVING GATEWAY ENTITY

CROSS-REFERENCE TO RELATED APPLICATIONS

This application is a continuation of International Application No. PCT/CN2011/083544, filed on Dec. 6, 2011, which claims priority to Chinese Patent Application No. CN 201010623225.4, filed on Dec. 31, 2010, and each application is hereby incorporated by reference in its entirety.

TECHNICAL FIELD

The present invention relates to the communication field, and in particular, to a method and device for selecting a serving gateway entity.

BACKGROUND

The third generation mobile communication standardization organization launches an SAE (System Architecture Evolution, system architecture evolution) system to enhance competitive strength of a future network. The SAE system includes network elements such as an eNodeB (enhanced NodeB, enhanced base station), an MME (Mobility Management Entity, mobility management entity), an SGW (Serving Gateway, serving gateway entity), and a PGW (Packet Network Data Gateway, packet data network gateway entity). When a UE (User Equipment, user equipment) accesses the SAE system and needs to establish a connection with a network, the MME selects an SGW and a PGW for the UE, and then the UE establishes a connection with a network through the eNodeB, and the SGW and PGW selected by the MME for the UE.

Currently, when the UE needs to establish a connection with the network, the MME acquires, according to the TAI (Tracking Arar Identity, tracking area identity) of the eNodeB selected by the UE, all SGWs capable of serving the UE, and acquires, according to an APN (Access Point Name, access point name) subscribed by the UE, a PGW capable of serving the UE; and then selects an SGW from all the acquired SGWs for the UE. Then the UE establishes a connection with the network through the eNodeB selected by the UE itself, the SGW selected by the MME, and the acquired PGW.

If a user plane path between the SGW selected by the MME for the UE and the eNodeB accessed by the UE fails, or a path between the SGW selected by the MME for the UE and the acquired PGW fails, establishment of the connection between the UE and the network fails; in this case, the MME needs to reselect an SGW for the UE to establish a connection, causing increase of time consumption of network access for the UE and a waste of a lot of network resources.

SUMMARY

To reduce time consumption of network access of a UE and save network resources, embodiments of the present invention provide a method and device for selecting a serving gateway entity. The technical solutions are as follows:

A method for selecting a serving gateway entity includes:
receiving an access request message of a user equipment UE sent by a base station, where the access request message includes location information of the base station;
acquiring, according to the location information of the base station, a signaling plane address list of serving gateway entities SGWs serving the UE; and
selecting, according to failure information of paths between the SGWs and neighboring network elements of the SGWs and the acquired signaling plane address list of SGWs serving the UE, an SGW having no failed path to a neighboring network element of the SGW to serve the UE.

A device for selecting a serving gateway entity includes:
a receiving module, configured to receive an access request message of a user equipment UE sent by a base station, where the access request message includes location information of the base station;
an acquiring module, configured to acquire, according to the location information of the base station received by the receiving module, a signaling plane address list of serving gateway entities SGWs serving the UE; and
a selecting module, configured to select, according to failure information of paths between the SGWs and neighboring network elements of the SGWs and the signaling plane address list of SGWs serving the UE acquired by the acquiring module, an SGW having no failed path to a neighboring network element of the SGW to serve the UE.

In the method and device for selecting a serving gateway entity according to the embodiments of the present invention, an SGW having no failed path to a neighboring network element of the SGW may be selected for a UE according to location information of a base station. In this way, the probability of successful one-time establishment of a connection for the UE is ensured, time consumption of network access of the UE is reduced, and network resources are saved.

DESCRIPTION OF EMBODIMENTS

To make the objectives, technical solutions, and advantages of the present invention more comprehensible, embodiments of the present invention are hereinafter described in detail with reference to the accompanying drawings.

Figure 1:
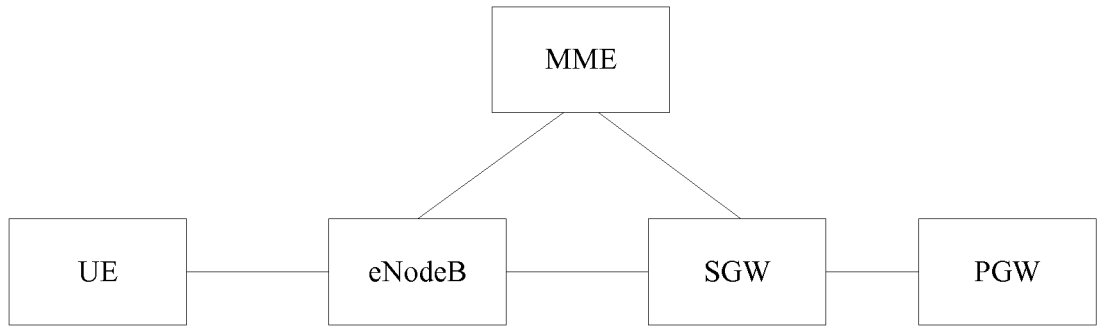
FIG. 1 is a network architecture to which an embodiment of the present invention is applied.

Embodiments of the present invention are applied to a network architecture shown in FIG. 1. An MME and an eNodeB are connected through an S1-MME interface, the MME and an SGW are connected through an S11 interface, the eNodeB and the SGW are connected through an S1-U interface, and the SGW and a PGW are connected through an S5/S8 interface. A control plane between the eNodeB and the SGW is deployed on the MME. Therefore, the path between the MME and the eNodeB and the path between the MME and the SGW are signaling plane paths, the path between the eNodeB and the SGW is a user plane path, and the paths between the SGW and the PGW include a user plane path and a control plane path.

Embodiment 1

Figure 2:
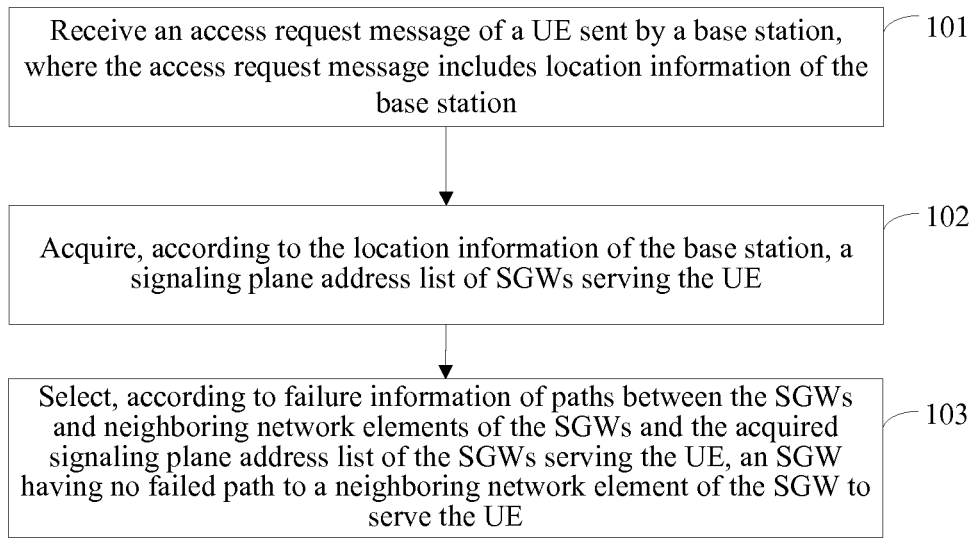
FIG. 2 is a flowchart of a method for selecting a serving gateway entity according to Embodiment 1 of the present invention.

As shown in FIG. 2, the embodiment of the present invention provides a method for selecting a serving gateway entity, where the method includes:

Step 101: Receive an access request message of a UE sent by a base station, where the access request message includes location information of the base station.

The access request message of the UE may be an initial UE message (Initial UE Message), an S1-AP message, a handover required message, a service request message, or the like.

Step 102: Acquire, according to the location information of the base station, a signaling plane address list of SGWs serving the UE.

Step 103: Select, according to failure information of paths between the SGWs and neighboring network elements of the SGWs and the acquired signaling plane address list of SGWs serving the UE, an SGW having no failed path to a neighboring network element of the SGW to serve the UE.

The executor of the method may be an MME, or may be an SGSN (SERVICING GPRS SUPPORT NODE, GPRS (General Packet Radio Service, general packet radio service) support node), or the like.

In the embodiment of the present invention, the failure information of the paths between the SGWs and the neighboring network elements of the SGWs includes:

failure information of paths between the SGWs and the base station, and/or failure information of paths between the SGWs and PGWs.

Further, the path failure information includes information about whether a path fails, and the path failure information may also include user plane path information and/or signaling plane path information.

Selecting, according to failure information of paths between the SGWs and neighboring network elements of the SGWs and the acquired signaling plane address list of SGWs serving the UE, an SGW having no failed path to a neighboring network element of the SGW to serve the UE, includes:

determining, according to the failure information of paths between the SGWs and neighboring network elements of the SGWs, a signaling plane address of an SGW having a failed path to a neighboring network element of the SGW, in the signaling plane address list of SGWs; and removing the signaling plane address of the SGW having a failed path to the neighboring network element of the SGW, from the signaling plane address list of SGWs, and then selecting an SGW for the UE according to the signaling plane address list of SGWs.

In another embodiment of the present invention, determining, according to the failure information of paths between the SGWs and neighboring network elements of the SGWs, a signaling plane address of an SGW having a failed path to a neighboring network element of the SGW, in the signaling plane address list of SGWs, includes at least one of the following manners:

determining, according to the location information of the base station and failure information of user plane paths between the base station and SGWs, a signaling plane address of an SGW having a failed user plane path to the base station;

determining, according to a signaling plane address of an acquired PGW and failure information of signaling plane paths between SGWs and PGWs, a signaling plane address of an SGW having a failed signaling plane path to the acquired PGW;

determining, according to a user plane address of an acquired PGW and failure information of user plane paths between SGWs and PGWs, a signaling plane address of an SGW having a failed user plane path to the acquired PGW.

In another embodiment of the present invention, selecting, according to failure information of paths between the SGWs and neighboring network elements of the SGWs and the acquired signaling plane address list of SGWs serving the UE, an SGW having no failed path to a neighboring network element of the SGW to serve the UE, includes:

receiving an S1-AP message sent by the base station after the base station detects that a user plane path to the selected SGW fails, where the S1-AP message includes a failure identifier of the user plane path; and storing correspondence between information of the base station and a signaling plane address of the selected SGW into the failure information of the user plane paths between the base station and the SGWs; and selecting, according to the failure information of the user plane paths between the base station and SGWs and the acquired signaling plane address list of SGWs serving the UE, an SGW having no failed path to the base station to serve the UE;

or receiving an S11 interface message sent by the selected SGW after the selected SGW detects that a user plane path to the base station fails, where the S11 interface message includes a failure identifier of the user plane path to the base station; and storing correspondence between information of the base station and a signaling plane address of the selected SGW into the failure information of the user plane paths between the base station and the SGWs; and selecting, according to the failure information of the user plane paths between the base station and the SGWs and the acquired signaling plane address list of SGWs serving the UE, an SGW having no failed path to the base station to serve the UE;

or receiving an S11 interface message sent by the selected SGW after the selected SGW detects that a signaling plane path to an acquired PGW fails, where the S11 interface message includes a failure identifier of the signaling plane path to the PGW; and storing correspondence between a signaling plane address of the selected SGW and a signaling plane address of the acquired PGW into the failure information of the signaling plane paths between the SGWs and the PGWs; and selecting, according to the failure information of the signaling plane paths between the SGWs and the PGWs and the acquired signaling plane address list of SGWs serving the UE, an SGW having no failed path to the acquired PGW to serve the UE;

or receiving an S11 interface message sent by the selected SGW after the selected SGW detects that a user plane path to an acquired PGW fails, where the S11 interface message includes a failure identifier of the user plane path to the PGW; and storing correspondence between a signaling plane address of the selected SGW and a user plane address of the acquired PGW into the failure information of the user plane paths between the SGWs and the PGWs; and selecting, according to the failure information of the user plane paths between the SGWs and the PGWs and the acquired signaling plane address list of SGWs serving the UE, an SGW having no failed path to the acquired PGW to serve the UE.

It should be noted that the base station may be an eNodeB, a NodeB, a radio network controller (RNC), or the like. The location information of the base station may include a TAI or CGI (Cell Global Identification, global cell identification) of the base station, or may be geographical location information of the base station, such as XX degrees east longitude, and XX degrees north latitude. A neighboring network element may be a base station, a PGW, or the like.

An SGW having no failed path to a neighboring network element of the SGW is selected to serve the UE, that is, the UE may establish a connection with a network side through the selected SGW.

In the embodiment of the present invention, the signaling plane address list of SGWs may be acquired according to the location information of the base station, and then an SGW having a normal path to a neighboring network element of the SGW is selected for the UE according to the signaling plane address list of SGWs and the failure information of the paths between the SGWs and the neighboring network elements of the SGWs, so that the probability of the failure of the path between the selected SGW and the PGW and the probability of the failure of the user plane path between the selected SGW and the base station are reduced. In this way, the probability of successful one-time establishment of a connection for the UE is ensured, time consumption of network access of the UE is reduced, and network resources are saved.

Embodiment 2

Figure 3:
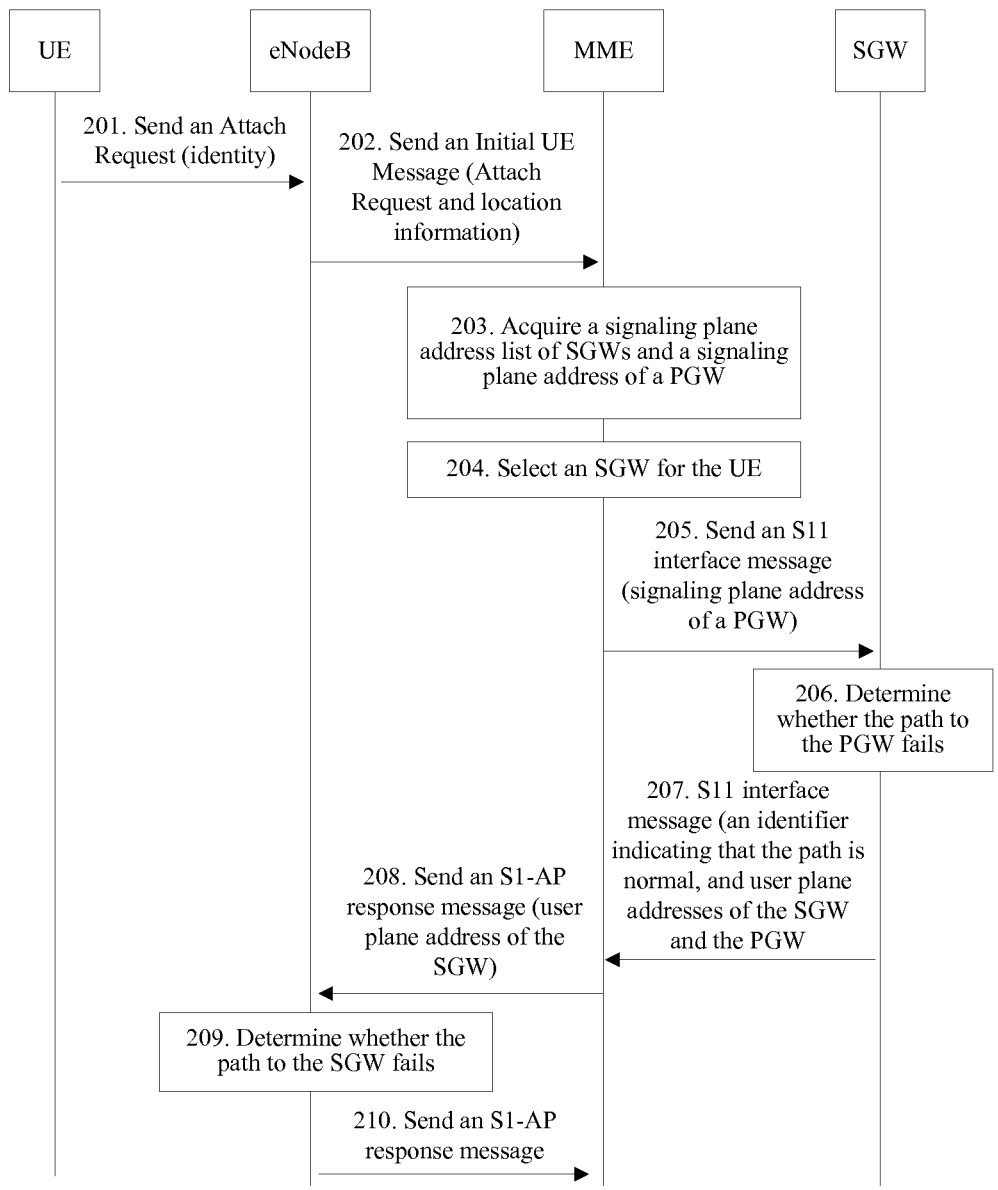
FIG. 3 is a flowchart of a method for selecting a serving gateway entity according to Embodiment 2 of the present invention.

The embodiment of the present invention provides a method for selecting a serving gateway entity. As shown in FIG. 3, the method includes:

Step 201: A UE sends an attach request (Attach Request) to an eNodeB, where the attach request includes an identifier of the UE.

Before sending the attach request, the UE first encapsulates the attach request in the form of a NAS (Non Access Stratum, non access stratum) message and then sends the message to the eNodeB.

The identifier of the UE may be an international mobile subscriber identification number (International Mobile Subscriber Identification Number, IMSI), an international mobile equipment identity IMEI (International Mobile Equipment Identity, IMEI), or the like.

Step 202: The eNodeB receives the attach request and sends an initial UE message (Initial UE Message) to an MME, where the initial UE message includes the attach request and location information of the eNodeB.

Each eNodeB in an SAE system selects beforehand, according to the load of the MMEs, an MME having a normal signaling plane path to the eNodeB. In addition, the location information of the eNodeB may be the TAI or CGI (Cell Global Identification, global cell identification) of the eNodeB.

Step 203: The MME receives the initial UE message, acquires a signaling plane address list of SGWs according to the location information of the eNodeB included in the initial UE message, and acquires a signaling plane address of a PGW according to the identifier of the UE.

Specifically, the MME constructs, according to the location information of the eNodeB, such as TAI, domain name information corresponding to the location information of the eNodeB, acquires, according to the constructed domain name information, signaling plane addresses of all SGWs corresponding to the constructed domain name information from a DNS Server (Domain Name System Server, domain name system server), and forms a signaling plane address list of SGWs; acquires a corresponding APN from an HSS (Home Subscriber server, home subscriber server) according to the identifier of the UE, acquires signaling plane addresses of all corresponding PGWs from the DNS Server according to the acquired APN, and selects a signaling plane address of a PGW for the UE from the acquired signaling plane addresses of all PGWs.

The operation of acquiring, by the MME according to the constructed domain name information, signaling plane addresses of all SGWs corresponding to the constructed domain name information from a DNS Server, is specifically as follows:

The MME sends a DNS resolve request (DNS Resolve Request) to the DNS Server, where the DNS resolve request includes the constructed domain name information; the DNS Server receives the DNS resolve request, acquires domain names of all corresponding SGWs according to the domain name information included in the DNS resolve request, resolves an acquired domain name of each SGW to acquire a signaling plane address of each SGW and form a signaling plane address list of SGWs, and sends a DNS resolve response (DNS Resolve Answer), where the DNS resolve response includes the signaling plane address list of SGWs. The MME receives the DNS resolve response.

The structure of the TAI is shown in Table 1. The TAI includes an MCC (Mobile Country Code, mobile country code), an MNC (Mobile Network Code, mobile network code), and a TAC (Tracking Area Code, tracking area code). The MCC and MNC occupy three bytes, and the TAC occupies two bytes.

TABLE 1

| Bytes | | | | Bits | | | | |
|---|---|---|---|---|---|---|---|---|
| | 8 | 7 | 6 | 5 | 4 | 3 | 2 | 1 |
| d | | MCC digit 2 | | | | MCC digit 1 | | |
| d + 1 | | MNC digit 3 | | | | MCC digit 3 | | |
| d + 2 | | MNC digit 2 | | | | MNC digit 1 | | |
| d + 3 to d + 4 | | | | Tracking Area Code (TAC) | | | | |

The format of the domain name is:
tac-lb<TAC-low-byte>.tac-hb<TAC-high-byte>.tac.epc.mnc<MNC>.mcc<MCC>.3gppnetwork.org.

It is assumed that: the MCC is 311, the MNC is 990, and the lower byte and higher byte of the TAC are 11 and 40, respectively. Then, the constructed domain name information is:
tac-lb11.tac-hb40.tac.epc.mnc990.mcc311.3gppnetwork.org.

Step 204: The MME selects an SGW for the UE according to the signaling plane address list of SGWs, the stored failure information of user plane paths between the eNodeB and SGWs and/or failure information of signaling plane paths between SGWs and PGWs.

Specifically, selecting, by the MME, an SGW for the UE according to the signaling plane address list of SGWs and the stored failure information of user plane paths between the eNodeB and SGWs, includes:

searching, according to the location information of the eNodeB included in the initial UE message, the failure information of the user plane paths between the eNodeB and the SGWs for a signaling plane address of an SGW having a failed user plane path to the eNodeB, where, the failure information of the user plane paths between the eNodeB and the SGWs includes correspondence between the location information of the eNodeB and signaling plane addresses of SGWs; the location information of the eNodeB and a signaling plane address of an SGW included in each record in the failure information of the user plane paths between the eNodeB and the SGWs are used to identify a failed user plane path between the eNodeB and the SGW;

removing, by the MME, a signaling plane address of the failed SGW from the acquired signaling plane address list of SGWs, and selecting a signaling plane address of an SGW from the signaling plane addresses of the remaining SGWs in the signaling plane address list of SGWs.

Selecting, by the MME, an SGW for the UE according to the acquired signaling plane address list of SGWs and the stored failure information of signaling plane paths between SGWs and PGWs, includes:

searching, according to a signaling plane address of an acquired PGW, the failure information of the signaling plane paths between the SGWs and the PGWs for a signaling plane address of an SGW having a failed signaling plane path to the PGW corresponding to the signaling plane address of the acquired PGW, where, the failure information of the paths between the SGWs and the PGWs includes correspondence between the signaling plane addresses of the SGWs and the signaling plane addresses of the PGWs; a signaling plane address of an SGW and a signaling plane address of a PGW included in each record in the failure information of the signaling plane paths between the SGWs and the PGWs are used to identify a failed signaling plane path between the SGW and the PGW;

removing, by the MME, a signaling plane address of the failed SGW from the acquired signaling plane address list of SGWs, and selects a signaling plane address of an SGW from the signaling plane addresses of the remaining SGWs in the signaling plane address list of SGWs.

Selecting, by the MME, an SGW for the UE according to the acquired signaling plane address list of SGWs, the stored failure information of signaling plane paths between SGWs and PGWs, and stored failure information of user plane paths between the eNodeB and SGWs, includes:

searching, according to the location information of the eNodeB included in the initial UE message, the failure information of the user plane paths between the eNodeB and the SGWs for a signaling plane address of an SGW having a failed user plane path to the eNodeB;

searching, according to a signaling plane address of an acquired PGW, the failure information of the signaling plane paths between the SGWs and the PGWs for a signaling plane address of an SGW having a failed signaling plane path to the PGW corresponding to the signaling plane address of the acquired PGW; and removing, by the MME, signaling plane addresses of all failed SGWs from the acquired signaling plane address list of SGWs, and selecting a signaling plane address of an SGW from the signaling plane addresses of the remaining SGWs in the signaling plane address list of SGWs.

The manner of selecting an SGW may be selecting an SGW nearest to the UE, or selecting an SGW whose load is the lightest, or selecting an SGW randomly, or the like.

Step 205: The MME sends an S11 interface request message to the corresponding SGW according to the signaling plane address of the selected SGW, where the S11 interface request message includes the signaling plane address of an acquired PGW.

The S11 interface request message may be a Create Session Request (create session request).

When the MME selects an SGW for the UE and establishes a connection, the MME stores the signaling plane address of the SGW and the user plane address of the SGW, and the MME also stores correspondence between the identifier of the UE and the SGW serving the UE, that is, the user plane address of the SGW serving the UE or the signaling plane address of the SGW may be determined according to the identifier of the UE. Meanwhile, the signaling plane address of the SGW may also be determined according to the user plane address of the SGW, and the user plane address of the SGW may also be determined according to the signaling plane address of the SGW.

Step 206: The SGW receives the S11 interface request message, and determines whether the path between the SGW and the PGW which is corresponding to the signaling plane address of the PGW included in the S11 interface request message fails.

Figure 4:
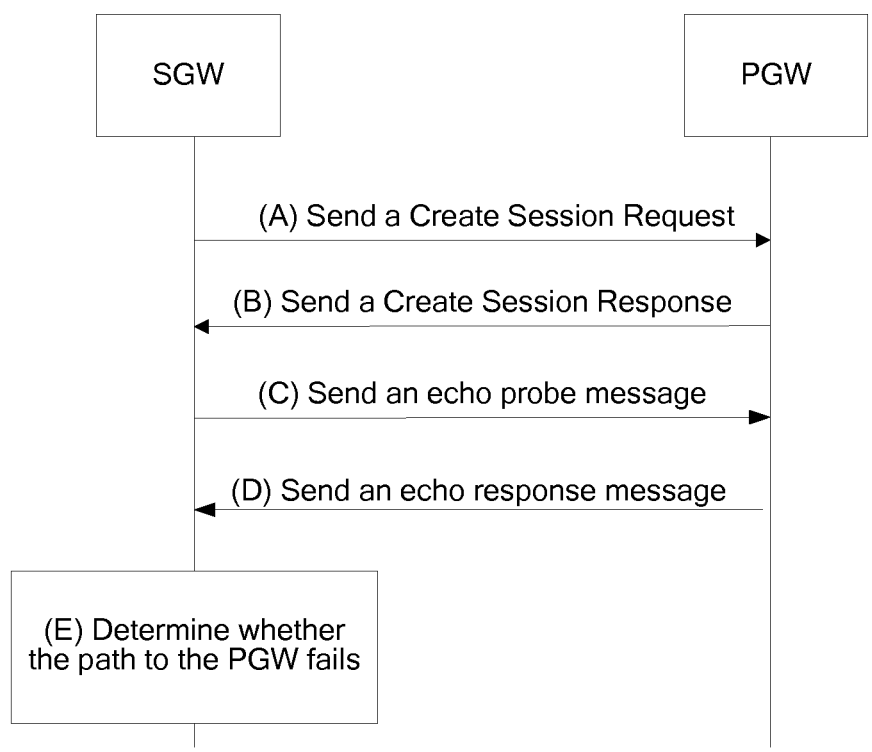
FIG. 4 is a flowchart of determining a failure of a path between an SGW and a PGW according to Embodiment 2 of the present invention.

Specifically, as shown in FIG. 4, the operation of determining, by the SGW, whether the path between the SGW and the PGW which is corresponding to the signaling plane address of the PGW included in the S11 interface request message fails may include the following steps (A) to (E):

(A) The SGW determines the corresponding signaling plane path according to the signaling plane address of the PGW included in the S11 interface request message, and forwards the create session request to the corresponding PGW through the signaling plane path.

The path between the SGW and the PGW includes a signaling plane path and a user plane path; the SGW forwards the create session request to the PGW through the signaling plane path; if the signaling plane path between the SGW and the PGW is normal, the PGW sends a session response message (Create Session Response) to the SGW within a preset duration.

(B) If the PGW receives the create session request, the PGW sends a session response message to the SGW within the preset duration, where the session response message includes the user plane address of the PGW.

(C) If the SGW receives, within the preset duration, the session response message returned by the PGW, the SGW sends an echo probe message to the PGW according to the user plane path corresponding to the user plane address included in the session response message; if the SGW does not receive, within the preset duration, the session response message returned by the PGW, the SGW determines that the signaling plane path between the SGW and the PGW fails, and this step ends and step 207 is executed.

If the SGW receives, within the preset duration, the session response message returned by the PGW, the SGW determines that the signaling plane path between the SGW and the PGW is normal.

(D) If the PGW receives the echo probe message sent by the SGW, the PGW sends an echo response message to the SGW within the preset duration.

(E) If the SGW receives, within the preset duration, the echo response message returned by the PGW, the SGW determines that the user plane path between the SGW and the PGW is normal; if the SGW does not receive, within the preset duration, the echo response message returned by the PGW, the SGW determines that the user plane path to the SGW fails, and step 207 is executed.

Step 207: The SGW sends an S11 interface message to the MME; if both the signaling plane path and user plane path between the SGW and the PGW are normal, the S11 interface message includes an identifier indicating that the path to the PGW is normal and includes the user plane addresses of the SGW and the PGW.

The S11 interface message may be a Create Session Response.

If the signaling plane path between the SGW and the PGW fails, the S11 interface message includes a failure identifier of the signaling plane path to the PGW; if the user plane path between the SGW and the PGW fails, the S11 interface message includes a failure identifier of the user plane path to the PGW and the user plane address of the PGW.

Step 208: The MME receives the S11 interface message returned by the SGW; if the S11 interface message includes an identifier indicating that the path between the SGW and the PGW is normal and the user plane addresses of the SGW and the PGW, the MME sends an S1-AP response message to the eNodeB, where the S1-AP response message includes the user plane address of the selected SGW.

The S1-AP response message may be an Initial Context Setup Request.

If the S11 interface message includes a failure identifier of the signaling plane path between the SGW and the PGW, the MME stores correspondence between the signaling plane address of the SGW and the signaling plane address of the PGW into the failure information of the signaling plane paths between the SGWs and the PGWs, then selects a signaling plane address of an SGW for the UE from the signaling plane addresses of the remaining unselected SGWs, and returns to step 205.

If the S11 interface message includes a failure identifier of the user plane path between the SGW and the PGW and the user plane addresses of the SGW and the PGW, the MME searches, according to the user plane address of the SGW, for the signaling plane address of the SGW, stores correspondence between the signaling plane address of the SGW and the user plane address of the PGW into the failure information of the user plane paths between the SGWs and the PGWs, and selects a signaling plane address of an SGW for the UE from the signaling plane addresses of the remaining unselected SGWs, and returns to step 205.

Step 209: The eNodeB receives the S1-AP response message, and determines, according to the user plane address of the SGW included in the S1-AP response message, whether the user plane path between the eNodeB and the corresponding SGW fails.

Specifically, the eNodeB receives the S1-AP response message, and sends an echo probe message to the corresponding SGW according to the user plane address of the SGW included in the S1-AP response message; and if the eNodeB does not receive, within a preset duration, an echo response message returned by the SGW, the eNodeB determines that the user path between the eNodeB and the SGW fails; otherwise, determines that the user plane path between the eNodeB and the SGW is normal.

Step 210: If the eNodeB determines that the user plane path between the eNodeB and the SGW is normal, the eNodeB sends an S1-AP message to notify the MME, where the S1-AP message includes an identifier indicating that the user plane path between the eNodeB and the SGW is normal.

If the eNodeB determines that the user plane path between the eNodeB and the SGW fails, the eNodeB sends an S1-AP message to notify the MME, where the S1-AP message includes a failure identifier of the user plane path between the eNodeB and the SGW.

Correspondingly, after receiving the S1-AP message, the MME stores correspondence between the location information of the eNodeB and the signaling plane address of the SGW into the failure information of the user plane paths between the eNodeB and the SGWs, selects a signaling plane address of an SGW for the UE from the signaling plane addresses of the remaining unselected SGWs, and returns to step 205.

In the above step, the S1-AP message received by the MME includes an identifier of the UE. The MME may determine, according to the identifier of the user equipment, the SGW selected for the UE, and therefore, the signaling plane address of the SGW may be found.

After the UE selects the SGW and acquires the PGW through the MME, the UE may establish a connection with a network, and then use the established connection to perform communication.

In the embodiment of the present invention, the MME acquires, according to the location information of the eNodeB, signaling plane addresses of all corresponding SGWs, searches, according to the failure information of the user plane paths between the eNodeB and the SGWs, for a signaling plane address of an SGW having a failed user plane path to the eNodeB, searches, according to the failure information of the signaling plane paths between the SGWs and the PGWs, for a signaling plane address of an SGW having a failed signaling plane path to an acquired PGW, removes the found signaling plane addresses of the SGWs from the acquired signaling plane address list of SGWs, and selects a signaling plane address of an SGW for the UE from the signaling plane addresses of the remaining SGWs, so that the probability of the failure of the path between the selected SGW and the PGW and the probability of the failure of the user plane path between the selected SGW and the eNodeB are reduced. In this way, the probability of successful one-time establishment of a connection for the UE is ensured, time consumption of network access of the UE is reduced, and network resources are saved.

Embodiment 3

Figure 5:
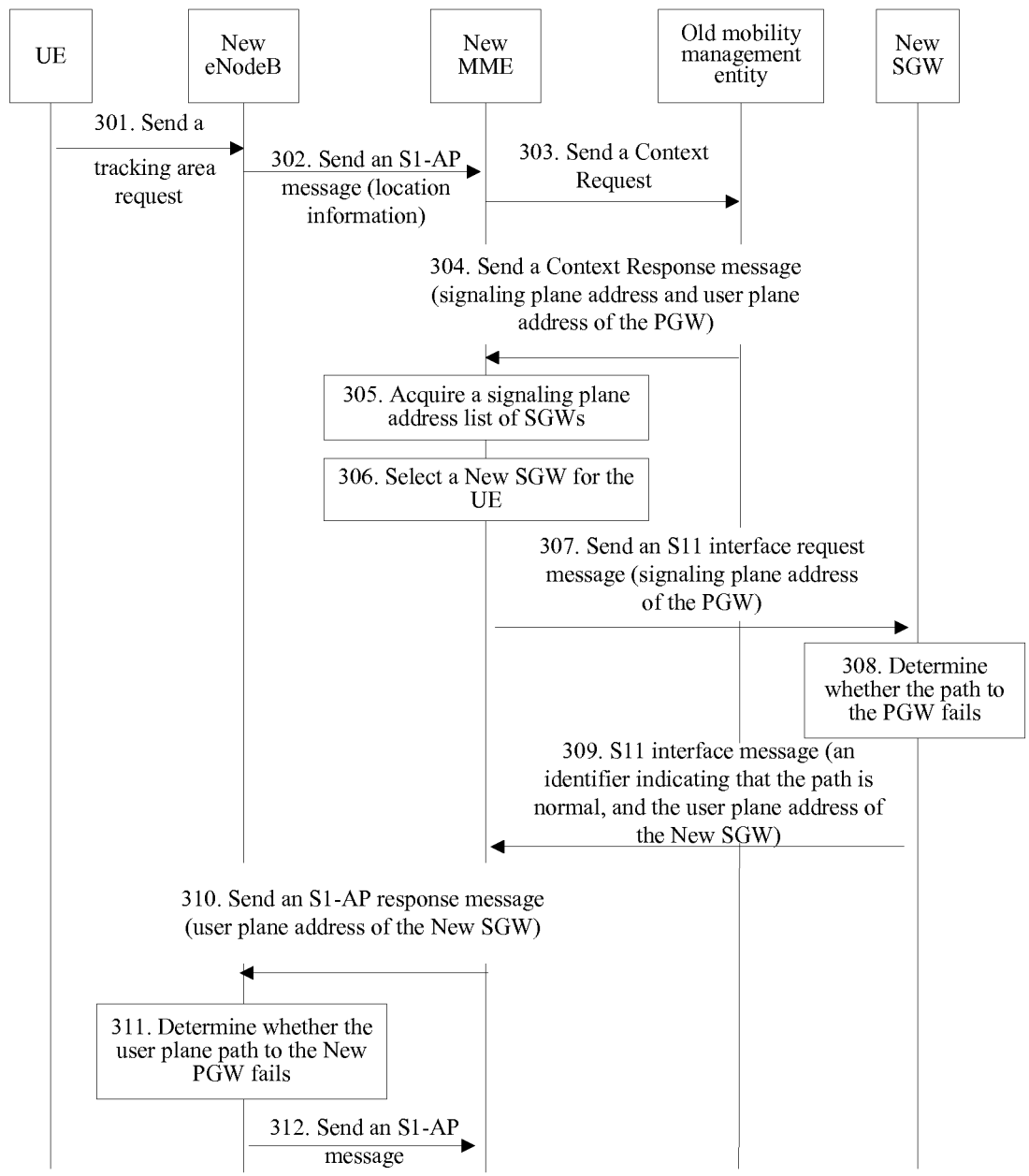
FIG. 5 is a flowchart of a method for selecting a serving gateway entity according to Embodiment 3 of the present invention.

The embodiment of the present invention provides a method for selecting a serving gateway entity. A UE first uses the method of Embodiment 1 to select an SGW, and then establishes a connection with a network and performs communication. In a communication process, the UE is handed over between tracking areas, that is, the UE is handed over from an old tracking area to a new tracking area, and the UE is handed over from an old eNodeB to a New eNodeB and is handed over from an old MME to a New MME. In this case, the New MME needs to reselect an SGW for the UE. Referring to FIG. 5, the method includes:

Step 301: A UE sends a tracking area update request to a New eNodeB.

The tracking area update request may be a TAU Request (Tracking Area Update request, tracking area update request).

Step 302: The New eNodeB receives the tracking area update request, and sends an S1-AP message to a New MME, where the S1-AP message includes the tracking area update request and location information of the New eNodeB.

If the UE is an ECM-IDLE (EPSConnectivityManagement-IDLE, EPS (Evolved Packet System, evolved packet system) connectivity management-idle) user, the S1-AP message used by the eNodeB is an Initial UE Message; if the UE is an ECM-CONNECT (EPSConnectivityManagement- CONNECT, EPS connectivity management-connected) user, the S1-AP message used by the eNodeB is Uplink NAS Transport.

Step 303: The New MME receives the S1-AP message, and sends a context request to an old mobility management entity.

The context request may be Context Request.

The old mobility management entity is a mobility management entity in an old tracking area, including an MME, an S4 SGSN, or a GnGp SGSN.

Step 304: The old mobility management entity receives the context request, and sends a context response message to the New MME, where the context response message includes a signaling plane address and user plane address of a PWG selected by the old MME.

The context response message may be Context Response.

Step 305: The New MME receives the context response message, and acquires a signaling plane address list of SGWs according to the location information of the New eNodeB in the S1-AP message.

Specifically, the specific process of acquiring the signaling plane address list of SGWs by the New MME is the same as the process of acquiring the signaling plane address list of SGWs by the MME in step 203 of Embodiment 2, and is not further described herein.

Step 306: The New MME selects a New SGW for the UE according to the signaling plane address list of SGWs, the stored failure information of user plane paths between the eNodeB and the SGWs, and failure information of signaling plane paths between the SGWs and PGWs and/or failure information of user plane paths between the SGWs and the PGWs.

Specifically, selecting, by the New MME, a New SGW for the UE according to the signaling plane address list of SGWs and the stored failure information of user plane paths between the eNodeB and the SGWs, includes:

searching, according to the location information of the New eNodeB, the failure information of the user plane paths between the eNodeB and the SGWs for a signaling plane address of an SGW having a failed user plane path to the New eNodeB; and removing the signaling plane address of the failed SGW from the acquired signaling plane address list of SGWs, and selecting a signaling plane address of a New SGW from the signaling plane addresses of the remaining SGWs in the signaling plane address list of SGWs.

Selecting, by the New MME, a New SGW for the UE according to the signaling plane address list of SGWs and the stored failure information of signaling plane paths between the SGWs and the PGWs, includes:

searching, according to the signaling plane address of a PGW included in a context request message, the failure information of the signaling plane paths between the SGWs and the PGWs for a signaling plane address of an SGW having a failed signaling plane path to the corresponding PGW; and removing the signaling plane address of the failed SGW from the acquired signaling plane address list of SGWs, and selecting a signaling plane address of a New SGW from the signaling plane addresses of the remaining SGWs in the signaling plane address list of SGWs.

Selecting, by the New MME, a New SGW for the UE according to the signaling plane address list of SGWs and the stored failure information of signaling plane paths between the SGWs and the PGWs, includes:

searching, according to the user plane address of a PGW included in the context request message, the failure information of the signaling plane paths between the SGWs and the PGWs for a signaling plane address of an SGW having a failed user plane path to the corresponding PGW; and removing the signaling plane address of the failed SGW from the acquired signaling plane address list of SGWs, and selecting a signaling plane address of a New SGW from the signaling plane addresses of the remaining SGWs in the signaling plane address list of SGWs.

Step 307: The New MME sends an S11 interface request message to the corresponding New SGW according to the signaling plane address of the selected New SGW, where the S11 interface request message includes the signaling plane address of the PGW included in the context response message.

Step 308: The New SGW receives the S11 interface request message, and determines whether the path between the New SGW and the PGW which is corresponding to the signaling plane address of the PGW included in the S11 interface request message fails.

Specifically, the process of determining, by the New SGW, whether the path between the New SGW and the PGW fails is the same as the process of determining, by the SGW, whether the path between the SGW and the PGW fails in step 206 of Embodiment 2, and is not further described herein.

Step 309: The New SGW sends an S11 interface message to the New MME; if the path between the New SGW and the PGW is normal, the S11 interface message includes an identifier indicating that the path to the PGW is normal and the user plane address of the New SGW.

If the signaling plane path between the New SGW and the PGW fails, the S11 interface message includes a failure identifier of the signaling plane path between the New SGW and the PGW; if the user plane path between the New SGW and the PGW fails, the S11 interface message includes a failure identifier of the user plane path between the New SGW and the PGW.

Step 310: The New MME receives the S11 interface message returned by the New SGW; if the S11 interface message includes an identifier indicating that the path is normal, the New MME sends an S1-AP response message to the eNodeB, where the S1-AP response message includes the user plane address of the New SGW.

If the S11 interface message includes a failure identifier of the signaling plane path between the New SGW and the PGW, the New MME stores correspondence between the signaling plane address of the New SGW and the signaling plane address of the PGW into the failure information of the signaling paths between the SGWs and the PGWs, then reselects a signaling plane address of a New SGW for the UE from the signaling plane addresses of the remaining unselected SGWs, and returns to step 307.

If the S11 interface message includes a failure identifier of the user plane path between the New SGW and the PGW, the New MME stores correspondence between the signaling plane address of the New SGW and the user plane address of the PGW into the failure information of the user plane paths between the SGWs and the PGWs, then reselects a signaling plane address of a New SGW for the UE from the signaling plane addresses of the remaining unselected SGWs, and returns to step 307.

Step 311: The New eNodeB receives the S1-AP response message, and determines, according to the user plane address of the New SGW included in the S1-AP response message, whether the user plane path between the New eNodeB and the New SGW fails.

Specifically, the process of determining, by the New eNodeB, whether the user plane path between the New eNodeB and the New SGW fails is the same as the process of determining, by the eNodeB, whether the user plane path between the eNodeB and the SGW fails in step 209 of Embodiment 2, and is not further described herein.

Step 312: If the New eNodeB determines that the user plane path between the New eNodeB and the New SGW is normal, the New eNodeB sends an S1-AP message to notify the New MME, where the S1-AP message includes an identifier indicating that the user plane path between the New eNodeB and the New SGW is normal.

If the New eNodeB determines that the user plane path between the New eNodeB and the New SGW fails, the New eNodeB sends an S1-AP message to notify the New MME, where the S1-AP message includes a failure identifier of the user plane path between the New eNodeB and the New SGW.

Correspondingly, the New MME receives the S1-AP message, stores correspondence between the location information of the New eNodeB and the ID of the selected New SGW into the failure information of the user plane paths between the eNodeB and the SGWs, then reselects a signaling plane address of a New SGW for the UE from the signaling plane addresses of the remaining unselected SGWs, and returns to step 307.

After the New SGW is selected for the UE, the UE may establish a connection with the network, and then use the established connection to perform communication.

In the embodiment of the present invention, the New MME acquires the signaling plane address list of SGWs according to location information of the New eNodeB, then finds, according to the failure information of the user plane paths between the eNodeB and the SGWs, the ID of an SGW having a failed user plane path to the New eNodeB, finds, according to the failure information of the signaling plane paths between the SGWs and the PGWs, a signaling plane address of an SGW having a failed signaling plane path to an acquired PGW, finds, according to the failure information of the user plane paths between the SGWs and the PGWs, a user plane address of an SGW having a failed user plane path to the acquired PGW, removes the found signaling plane addresses of the SGWs from the acquired signaling plane address list of SGWs, and selects a signaling plane address of a New SGW for the UE from the signaling plane addresses of the remaining SGWs, so that the probability of the failure of the path between the selected New SGW and the PGW and the probability of the failure of the user plane path between the selected New SGW and the New eNodeB are reduced. In this way, the probability of successful one-time establishment of a connection for the UE is ensured, time consumption of network access of the UE is reduced, and network resources are saved.

Embodiment 4

Figure 6:
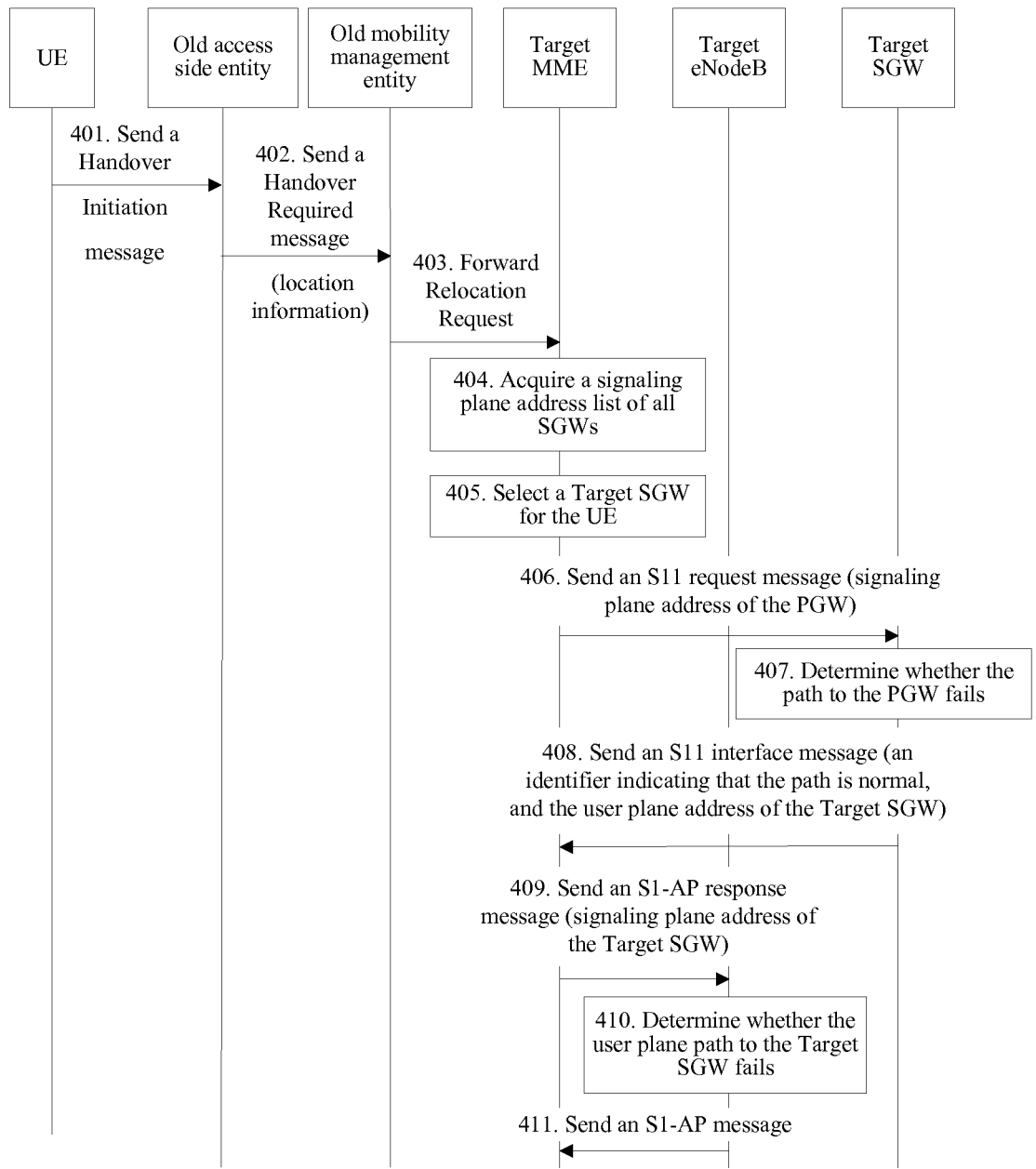
FIG. 6 is a flowchart of a method for selecting a serving gateway entity according to Embodiment 4 of the present invention.

The embodiment of the present invention provides a method for selecting a serving gateway entity. A UE first uses the method of Embodiment 1 to select an SGW, and then establishes a connection with a network and performs communication. In a communication process, the UE is handed over between service areas, that is, the UE is handed over from an old service area to a new service area, and the UE is handed over from an old eNodeB of the old service area to a New Target eNodeB of the new service area, and is handed over from an old MME of the old service area to a New Target MME of the new service area. In this case, the UE needs to reselect a new Target SGW. Referring to FIG. 6, the method includes:

Step 401: A UE sends a handover initiation message (Handover Initiation) to an old access side entity, where the handover initiation message includes location information of a Target eNodeB.

When the UE is handed over between service areas, the UE accesses a new Target eNodeB in a new service area and acquires location information of the Target eNodeB.

The old access side entity is an access side entity in an old service area, including: an eNodeB, an RNC (Radio Network Controller, radio network controller), or a BSS (Base Station Sub-system, base station sub-system).

Step 402: The old access side entity receives the handover initiation message, and sends a handover required message to an old mobility management entity, where the handover required message includes location information of the Target eNodeB included in the handover initiation message.

The old mobility management entity is a mobility management entity in the old service area, including an MME, an S4 SGSN, or a GnGp SGSN.

Step 403: The old mobility management entity receives the handover required message, and sends a forward relocation request (Forward Relocation Request) to a Target MME, where the forward relocation request includes location information of the Target eNodeB and the signaling plane address and user plane address of a PGW acquired by an old MME.

Step 404: The Target MME receives the forward relocation request, and acquires a signaling plane address list of SGWs according to the location information of the Target eNodeB included in the forward relocation request.

Specifically, the process of acquiring the signaling plane address list of SGWs by the Target MME according to location information of the Target eNodeB is the same as the process of acquiring the signaling plane address list of SGWs by the eNodeB in step 203 of Embodiment 2, and is not further described herein.

Step 405: The Target MME selects a signaling plane address of a Target SGW for the UE according to the signaling plane address list of SGWs, the stored failure information of the user plane paths between the eNodeB and the SGWs, and failure information of the signaling plane paths between the SGWs and PGWs and/or failure information of the user plane paths between the SGWs and the PGWs.

Specifically, selecting, by the Target MME, a Target SGW for the UE according to the signaling plane address list of SGWs and the stored failure information of the user plane paths between the eNodeB and the SGWs, includes:

searching, according to the location information of the Target eNodeB, the failure information of the user plane paths between the eNodeB and the SGWs for a signaling plane address of an SGW having a failed user plane path to the Target eNodeB; and removing the signaling plane address of the failed SGW from the acquired signaling plane address list of SGWs, and selecting a signaling plane address of a Target SGW from the signaling plane addresses of the remaining SGWs in the signaling plane address list of SGWs.

Selecting, by the Target MME, a Target SGW for the UE according to the signaling plane address list of SGWs and the stored failure information of the signaling plane paths between the SGWs and the PGWs, includes:

searching, according to the signaling plane address of the PGW included in the forward relocation request, the failure information of the signaling plane paths between the SGWs and the PGWs for a signaling plane address of an SGW having a failed signaling plane path to the corresponding PGW; and removing the signaling plane address of the failed SGW from the acquired signaling plane address list of SGWs, and selecting a signaling plane address of a Target SGW from the signaling plane addresses of the remaining SGWs in the signaling plane address list of SGWs.

Selecting, by the Target MME, a Target SGW for the UE according to the signaling plane address list of SGWs and the stored failure information of the user plane paths between the SGWs and the PGWs, includes:

searching, according to the signaling plane address of the PGW included in the forward relocation request, the failure information of the user plane paths between the SGWs and the PGWs for a signaling plane address of an SGW having a failed user plane path to the corresponding PGW; and removing the signaling plane address of the failed SGW from the acquired signaling plane address list of SGWs, and selecting a signaling plane address of a Target SGW from the signaling plane addresses of the remaining SGWs in the signaling plane address list of SGWs.

Step 406: The Target MME sends an S11 interface request message to the corresponding Target SGW according to the signaling plane address of the selected Target SGW, where the S11 interface request message includes the signaling plane address of the PGW included in the forward relocation request.

Step 407: The Target SGW receives the S11 interface request message, and determines whether the path between the Target SGW and the PGW which is corresponding to the signaling plane address of the PGW included in the S11 interface request message fails.

Specifically, the process of determining, by the Target SGW, whether the path between the Target SGW and the PGW fails is the same as the process of determining, by the SGW, whether the path between the SGW and the PGW fails in step 206 of Embodiment 2, and is not further described herein.

Step 408: The Target SGW sends an S11 interface message to the Target MME; if both the user plane path and signaling plane path between the Target SGW and the PGW are normal, the S11 interface message includes an identifier of the path between the Target SGW and the PGW is normal and the user plane address of the Target SGW.

If the signaling plane path between the Target SGW and the PGW fails, the S11 interface message includes a failure identifier of the signaling plane path between the Target SGW and the PGW; if the user plane path between the Target SGW and the PGW fails, the S11 interface message includes a failure identifier of the user plane path between the Target SGW and the PGW.

Step 409: The Target MME receives the S11 interface message returned by the Target SGW; if the S11 interface message includes an identifier indicating that the path between the SGW and the PGW is normal, the Target MME sends an S1-AP response message to the Target eNodeB, where the S1-AP response message includes the user plane address of the Target SGW.

If the S11 interface message includes a failure identifier of a signaling plane path between an SGW and a PGW, the Target MME stores correspondence between the signaling plane address of the Target SGW and the signaling plane address of the PGW into the failure information of the signaling plane paths between the SGWs and the PGWs, then reselects a signaling plane address of an SGW for the UE from the signaling plane addresses of the remaining unselected SGWs, and returns to step 406.

If the S11 interface message includes a failure identifier of a user plane path between an SGW and a PGW, the Target MME stores correspondence between the signaling plane address of the Target SGW and the user plane address of the PGW into the failure information of the user plane paths between the SGWs and the PGWs, reselects a signaling plane address of an SGW for the UE from the signaling plane addresses of the remaining unselected SGWs, and then returns to step 406.

Step 410: The Target eNodeB receives the S1-AP response message, and determines, according to the user plane address of the Target SGW included in the S1-AP response message, whether the user plane path between the Target eNodeB and the Target SGW fails.

Specifically, the process of determining, by the Target eNodeB, whether the user plane path between the Target eNodeB and the Target SGW fails is the same as the process of determining, by the eNodeB, whether the user plane path between the eNodeB and the SGW fails in step 209 of Embodiment 2, and is not further described herein.

Step 411: If the Target eNodeB determines that the user plane path between the Target eNodeB and the Target SGW is normal, the Target eNodeB sends an S1-AP message to notify the Target MME, where the S1-AP message includes an identifier indicating that the user plane path between the Target eNodeB and the Target SGW is normal.

If the Target eNodeB determines that the user plane path between the Target eNodeB and the Target SGW fails, the Target eNodeB sends an S1-AP message to notify the Target MME, where the S1-AP message includes a failure identifier of the user plane path between the Target eNodeB and the Target SGW.

Correspondingly, the Target MME receives the S1-AP message, stores correspondence between the location information of the Target eNodeB and the signaling plane address of the Target SGW into the failure information of the user plane paths between the eNodeB and the SGWs, reselects a signaling plane address of a new Target SGW for the UE from the signaling plane addresses of the remaining unselected SGWs, and returns to step 406.

In the embodiment of the present invention, the Target MME acquires the signaling plane address list of SGWs according to location information of the Target eNodeB, then finds, according to the failure information of the user plane paths between the eNodeB and the SGWs, a signaling plane address of an SGW having a failed user plane path to the Target eNodeB, finds, according to the failure information of the paths between the SGWs and the PGWs, a signaling plane address of an SGW having a failed signaling plane path to an acquired PGW, finds, according to the failure information of the user paths between the SGWs and the PGWs, a signaling plane address of an SGW having a failed user plane path to the acquired PGW, removes the found signaling plane addresses of the SGWs from the acquired signaling plane address list of SGWs, and selects a signaling plane address of a Target SGW for the UE from the signaling plane addresses of the remaining SGWs, so that the probability of the failure of the path between the selected Target SGW and the PGW and the probability of the failure of the user plane path between the selected Target SGW and the Target eNodeB are reduced. In this way, the probability of successful one-time establishment of a connection for the UE is ensured, time consumption of network access of the UE is reduced, and network resources are saved.

Embodiment 5

The embodiment of the present invention provides a method for selecting a serving gateway entity. A UE uses the method of Embodiment 2 to select an SGW, and then establishes a connection with a network and performs communication; an eNodeB detects in real time whether a user plane path between the eNodeB and an SGW fails, and if detecting that the user plane path between the eNodeB and the SGW fails, sends an S1-AP message to notify an MME, where the S1-AP message includes a failure identifier. The MME receives the S1-AP message, and stores correspondence between location information of the eNodeB and a signaling plane address of the SGW into failure information of user plane paths between the eNodeB and SGWs.

In addition, the SGW also detects in real time whether a user plane path between the SGW and the eNodeB fails, and if so, sends an S11 interface message to the MME, where the S11 interface message includes a failure identifier of the user plane path to the eNodeB. The MME receives the S11 interface message, and stores correspondence between location information of the eNodeB and a signaling plane address of the SGW into the failure information of the user plane paths between the eNodeB and the SGWs.

Further, the SGW detects in real time whether a signaling plane path between the SGW and a PGW fails, and if detecting that the signaling plane path between the SGW and the PGW fails, sends an S11 interface message to the MME, where the S11 interface message includes a failure identifier of the signaling plane path to the PGW. The MME receives the S11 interface message, and stores correspondence between a signaling plane address of the SGW and a signaling plane address of the PGW into failure information of signaling plane paths between SGWs and PGWs.

Further, the SGW detects in real time whether a user plane path between the SGW and the PGW fails, and if detecting that the user plane path between the SGW and the PGW fails, sends an S11 interface message to the MME, where the S11 interface message includes a failure identifier of the user plane path to the PGW. The MME receives the S11 interface message, and stores correspondence between a user plane address of the SGW and a user plane address of the PGW into failure information of user plane paths between the SGWs and the PGWs.

Figure 7:
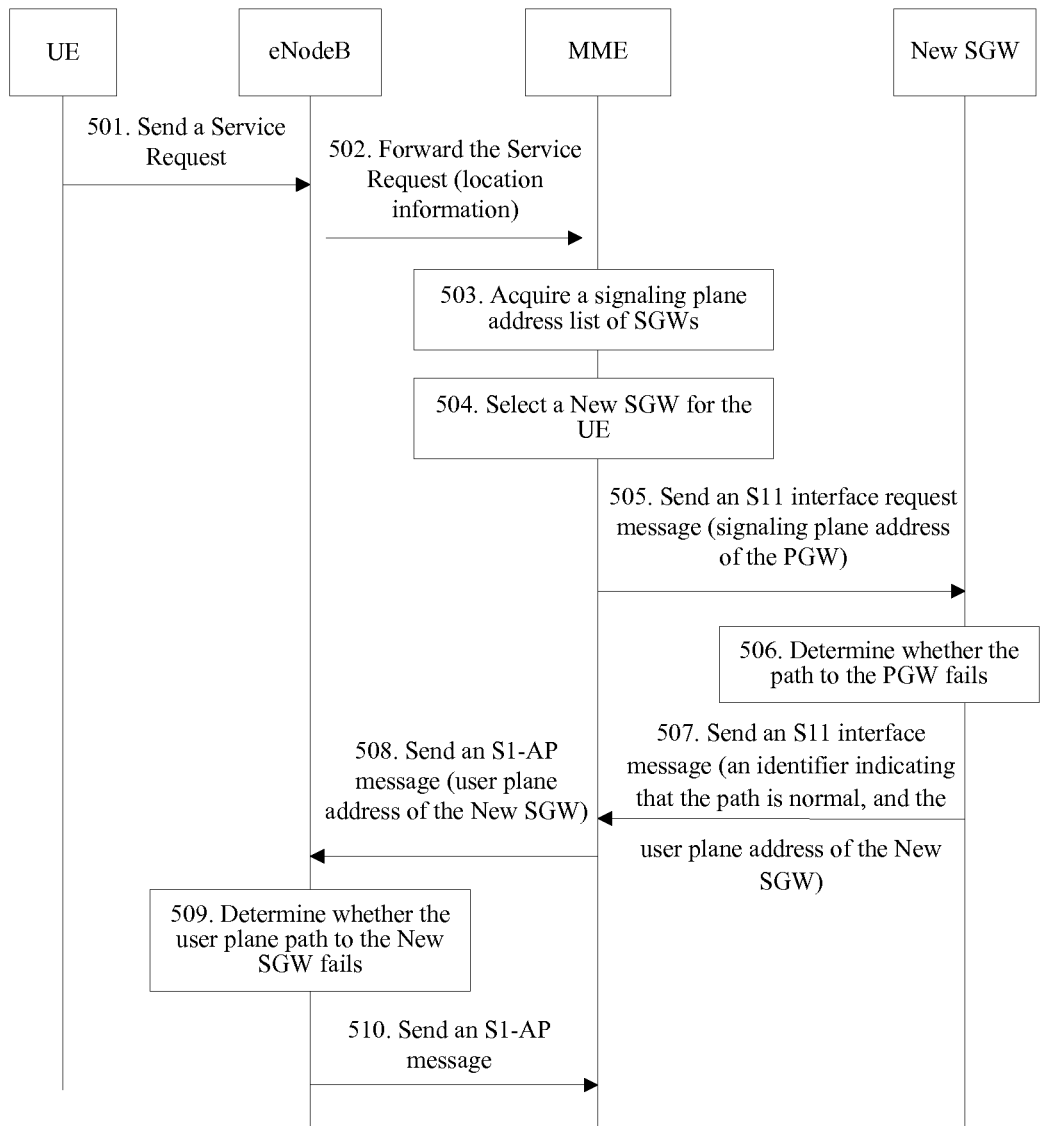
FIG. 7 is a flowchart of a method for selecting a serving gateway entity according to Embodiment 5 of the present invention.

If the user plane path between the eNodeB and the SGW fails, the SGW detects that the signaling plane path between the SGW and the PGW fails, the SGW detects that the user plane path between the SGW and the PGW fails, or the SGW detects that a path between the SGW and the PGW fails, the MME needs to reselect a New SGW for the UE. Referring to FIG. 7, the method includes:

Step 501: A UE sends a service request (Server Request) to an eNodeB.

If a user plane path between an eNodeB and an SGW fails, an SGW detects that a signaling plane path between the SGW and a PGW fails, the SGW detects that a user plane path between the SGW and the PGW fails, or the SGW detects that a user plane path between the SGW and the eNodeB fails, the eNodeB releases the air interface with the UE; and then the UE sends a service request to request selecting a New SGW.

Step 502: The eNodeB receives the service request, adds location information of the eNodeB to the service request, and forwards the service request to the MME.

Step 503: The MME receives the service request, and acquires a signaling plane address list of SGWs according to the location information of the eNodeB included in the service request.

Specifically, the process of acquiring the signaling plane address list of SGWs by the MME according to location information of the eNodeB is the same as the process of acquiring the signaling plane address list of SGWs by the eNodeB in step 203 of Embodiment 2, and is not further described herein.

Step 504: The MME reselects a New SGW for the UE according to the acquired signaling plane address list of SGWs, the failure information of user plane paths between the eNodeB and SGWs, and failure information of signaling plane paths between the SGWs and PGWs, and/or failure information of user plane paths between the SGWs and the PGWs.

Specifically, selecting, by the MME, a New SGW for the UE according to the signaling plane address list of SGWs and the stored failure information of user plane paths between the eNodeB and SGWs, includes:

searching, according to the location information of the eNodeB, the failure information of the user plane paths between the eNodeB and the SGWs for a signaling plane address of an SGW having a failed user plane path to the eNodeB; and removing the signaling plane address of the failed SGW from the acquired signaling plane address list of SGWs, and selecting a signaling plane address of a New SGW from the signaling plane addresses of the remaining SGWs in the signaling plane address list of SGWs.

Selecting, by the MME, a New SGW for the UE according to the signaling plane address list of SGWs and the stored failure information of user plane paths between the SGWs and PGWs, includes:

searching, according to a signaling plane address of an acquired PGW, the failure information of the signaling plane paths between the SGWs and the PGWs for a signaling plane address of an SGW having a failed signaling plane path to the PGW; and removing the signaling plane address of the failed SGW from the acquired signaling plane address list of SGWs, and selecting a signaling plane address of a New SGW from the signaling plane addresses of the remaining SGWs in the signaling plane address list of SGWs.

Selecting, by the MME, a New SGW for the UE according to the signaling plane address list of SGWs and the stored failure information of signaling plane paths between the SGWs and PGWs, includes:

searching, according to a user plane address of an acquired PGW, the failure information of the user plane paths between the SGWs and the PGWs for a signaling plane address of an SGW having a failed user plane path to the PGW; and removing the signaling plane address of the failed SGW from the acquired signaling plane address list of SGWs, and selecting a signaling plane address of a New SGW from the signaling plane addresses of the remaining SGWs in the signaling plane address list of SGWs.

Step 505: The MME sends an S11 interface request message to the corresponding New SGW according to the signaling plane address of the selected New SGW, where the S11 interface request message includes the signaling plane address of an acquired PGW.

Step 506: The New SGW receives the S11 interface request message, and determines whether a path between the New SGW and the PGW which is corresponding to the signaling plane address of the PGW included in the S11 interface request message fails.

Specifically, the process of determining, by the New SGW, whether the path between the New SGW and the PGW fails is the same as the process of determining, by the SGW, whether the path between the SGW and the PGW fails in step 206 of Embodiment 2, and is not further described herein.

Step 507: The New SGW sends an S11 interface message to a New MME; if the path between the New SGW and the PGW is normal, the S11 interface message includes an identifier of the path between the New SGW and the PGW is normal and the user plane address of the New SGW.

If the signaling plane path between the New SGW and the PGW fails, the S11 interface message includes a failure identifier of the signaling plane path between the New SGW and the PGW; if the user plane path between the New SGW and the PGW fails, the S11 interface message includes a failure identifier of the user plane path between the New SGW and the PGW.

Step 508: The MME receives the S11 interface message returned by the New SGW; if the S11 interface message includes an identifier indicating that the path is normal, the MME sends an S1-AP response message to the eNodeB, where the S1-AP response message includes the user plane address of the New SGW.

If the S11 interface message includes a failure identifier of the signaling plane path between the New SGW and the PGW, the MME stores correspondence between a signaling plane address of the New SGW and a signaling plane address of the PGW into the failure information of the signaling plane paths between the SGWs and the PGWs, reselects a signaling plane address of a New SGW for the UE from the signaling plane addresses of the remaining unselected SGWs, and then returns to step 505.

If the S11 interface message includes a failure identifier of the user plane path between the New SGW and the PGW, the MME stores correspondence between a signaling plane address of the New SGW and a user plane address of the PGW into the failure information of the user plane paths between the SGWs and the PGWs, reselects a new signaling plane address of a New SGW for the UE from the signaling plane addresses of the remaining unselected SGWs, and then returns to step 505.

Step 509: The eNodeB receives the S1-AP response message, and determines, according to the user plane address of the SGW included in the S1-AP response message, whether the user plane path between the eNodeB and the corresponding New SGW fails.

Specifically, the process of determining, by the eNodeB, whether the path between the eNodeB and the New SGW fails is the same as the process of determining, by the eNodeB, whether the path between the eNodeB and the SGW fails in step 209 of Embodiment 2, and is not further described herein.

Step 510: If the eNodeB determines that the user plane path between the eNodeB and the New SGW is normal, the eNodeB sends an S1-AP message to notify the MME, where the S1-AP message includes an identifier indicating that the user plane path between the eNodeB and the SGW is normal.

If the eNodeB determines that the user plane path between the eNodeB and the New SGW fails, the eNodeB sends an S1-AP message to notify the MME, where the S1-AP message includes a failure identifier of the user plane path between the eNodeB and the PGW.

Correspondingly, the MME receives the S1-AP message, stores correspondence between location information of the eNodeB and a signaling plane address of the selected SGW into the failure information of the user plane paths between the eNodeB and the SGWs, reselects a signaling plane address of a New SGW for the UE from the signaling plane addresses of the remaining unselected SGWs, and returns to step 505.

After an ID of the New SGW is selected for the UE, the UE may establish a connection with a network, and then use the established connection to perform communication.

In the embodiment of the present invention, the MME acquires signaling plane addresses of all corresponding SGWs according to location information of the eNodeB, then finds, according to the failure information of the user plane paths between the eNodeB and the SGWs, a signaling plane address of an SGW having a failed user plane path to the eNodeB, finds, according to the failure information of the paths between the SGWs and the PGWs, a signaling plane address of an SGW having a failed signaling plane path to an acquired PGW, finds, according to the failure information of the user plane paths between the SGWs and the PGWs, a signaling plane address of an SGW having a failed user plane path to the acquired PGW, removes the found signaling plane addresses of the SGWs from the acquired signaling plane addresses of all the SGWs, and selects a signaling plane address of a New SGW for the UE from the signaling plane addresses of the remaining SGWs, so that the probability of the failure of the path between the selected New SGW and the PGW and the probability of the failure of the user plane path between the selected New SGW and the New eNodeB are reduced. In this way, the probability of successful one-time establishment of a connection for the UE is ensured, time consumption of network access of the UE is reduced, and network resources are saved.

Embodiment 6

Figure 8:
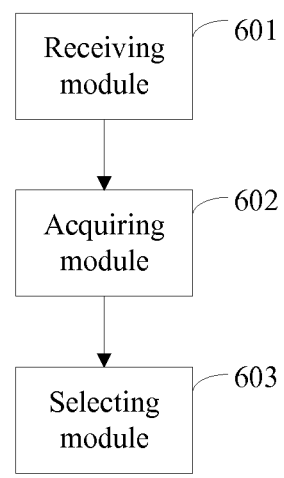
FIG. 8 is a schematic diagram of a device for selecting a serving gateway entity according to Embodiment 6 of the present invention.

As shown in FIG. 8, the embodiment of the present invention provides a device for selecting a serving gateway entity, where the device includes:

a receiving module 601, configured to receive an access request message of a UE sent by a base station, where the access request message includes location information of the base station;

an acquiring module 602, configured to acquire, according to the location information of the base station received by the receiving module 601, a signaling plane address list of SGWs serving the UE; and a selecting module 603, configured to select, according to failure information of paths between the SGWs and neighboring network elements of the SGWs and the signaling plane address list of SGWs serving the UE acquired by the acquiring module 602, an SGW having no failed path to a neighboring network element of the SGW to serve the UE.

In an embodiment of the present invention, the selecting module 603 specifically includes:

an acquiring unit, configured to determine, according to the failure information of the paths between the SGWs and the neighboring network elements of the SGWs, a signaling plane address of each SGW having a failed path to a neighboring network element of the each SGW, in the signaling plane address list of SGWs; and a selecting unit, configured to remove the signaling plane address of the SGW having a failed path to a neighboring network element of the SGW, from the signaling plane address list of SGWs, and then select an SGW for the UE according to the signaling plane address list of SGWs.

The failure information of paths between the SGWs and the neighboring network elements of the SGWs includes at least one piece of the following information:

failure information of user plane paths between the base station and SGWs;

failure information of signaling plane paths between the SGWs and PGWs; and failure information of user plane paths between the SGWs and the PGWs.

In another embodiment of the present invention, the acquiring unit includes at least one of the following acquiring sub-units:

a first acquiring subunit, configured to determine, according to the location information of the base station and the failure information of the user plane paths between the base station and the SGWs, a signaling plane address of an SGW having a failed user plane path to the base station;

a second acquiring subunit, configured to determine, according to a signaling plane address of an acquired PGW and the failure information of the signaling plane paths between the SGWs and the PGWs, a signaling plane address of an SGW having a failed signaling plane path to the acquired PGW;

a third acquiring subunit, configured to determine, according to a user plane address of an acquired PGW and the failure information of the user plane paths between the SGWs and the PGWs, a signaling plane address of an SGW having a failed user plane path to the acquired PGW.

Further, in another embodiment of the present invention, the selecting module 603 includes:

a first storing unit, configured to receive an S1-AP message sent by the base station after the base station detects that a user path to the selected SGW fails, where the S1-AP message includes a failure identifier of the user plane path; and store correspondence between location information of the base station and a signaling plane address of the selected SGW into the failure information of the user plane paths between the base station and the SGWs; and a first selecting unit, configured to select, according to the failure information of the user plane paths between the base station and the SGWs and the acquired signaling plane address list of SGWs serving the UE, an SGW having no failed path to the base station to serve the UE.

Further, in another embodiment of the present invention, the selecting module 603 includes:

a second storing unit, configured to receive an S11 interface message sent by the selected SGW after the selected SGW detects that a user path to the base station fails, where the S11 interface message includes a failure identifier of the user plane path to the base station; and store correspondence between location information of the base station and a signaling plane address of the selected SGW into the failure information of the user plane paths between the base station and the SGWs; and a second selecting unit, configured to select, according to the failure information of the user plane paths between the base station and the SGWs and the acquired signaling plane address list of SGWs serving the UE, an SGW having no failed path to the base station to serve the UE.

Further, in another embodiment of the present invention, the selecting module 603 includes:

a third storing unit, configured to receive an S11 interface message sent by the selected SGW after the selected SGW detects that a signaling plane path to an acquired PGW fails, where the S11 interface message includes a failure identifier of the signaling plane path to the PGW; and store correspondence between a signaling plane address of the selected SGW and a signaling plane address of the acquired PGW into the failure information of the signaling plane paths between the SGWs and the PGWs; and a third selecting unit, configured to select, according to the failure information of the signaling plane paths between the SGWs and the PGWs and the acquired signaling plane address list of SGWs serving the UE, an SGW having no failed path to the acquired PGW to serve the UE.

Further, in another embodiment of the present invention, the selecting module 603 includes:

a fourth storing unit, configured to receive an S11 interface message sent by the selected SGW after the selected SGW detects that a user plane path to an acquired PGW fails, where the S11 interface message includes a failure identifier of the user plane path to the PGW; and store correspondence between a signaling plane address of the selected SGW and a user plane address of the acquired PGW into the failure information of the user paths between the SGWs and the PGWs; and a fourth selecting unit, configured to select, according to the failure information of the user plane paths between the SGWs and the PGWs and the acquired signaling plane address list of SGWs serving the UE, an SGW having no failed path to the acquired PGW to serve the UE.

In the embodiment of the present invention, the MME acquires, according to the location information of the eNodeB, signaling plane addresses of all corresponding SGWs, searches, according to the failure information of the user plane paths between the eNodeB and the SGWs, for a signaling plane address of an SGW having a failed user plane path to the eNodeB, searches, according to the failure information of the signaling plane paths between the SGWs and the PGWs, for a signaling plane address of an SGW having a failed signaling plane path to an acquired PGW, removes the found signaling plane addresses of the SGWs from the acquired signaling plane address list of SGWs, and selects a signaling plane address of an SGW for the UE from the signaling plane addresses of the remaining SGWs, so that the probability of the failure of the path between the selected SGW and the PGW and the probability of the failure of the user plane path between the selected SGW and the eNodeB are reduced. In this way, the probability of successful one-time establishment of a connection for the UE is ensured, time consumption of network access of the UE is reduced, and network resources are saved.

All or a part of the content disclosed in the technical solutions provided by the embodiments can be implemented by software programming. The programs may be stored in a readable storage medium, such as a hard disk, a CD-ROM, or a floppy disk in a computer.

The above description is merely about preferred embodiments of the present invention, but is not intended to limit the present invention. Any modification, equivalent substitution, improvement, and so on within the idea and principle of the present invention shall fall within the protection scope of the present invention.

What is claimed is:

1. A method for selecting a serving gateway entity, wherein the method comprises:

receiving an access request message of a user equipment (UE) sent by a base station, wherein the access request message comprises location information of the base station;

acquiring, according to the location information of the base station, a signaling plane address list of serving gateway entities (SGWs) serving the UE; and selecting, according to failure information of paths between the SGWs and neighboring network elements of the SGWs and the acquired signaling plane address list of SGWs serving the UE, an SGW having no failed path to a neighboring network element of the SGW to serve the UE, wherein the failure information of the paths between the SGWs and the neighboring network elements of the SGWs comprises at least one piece of the following information:
  failure information of user plane paths between the base station and the SGWs;
  failure information of signaling plane paths between the SGWs and packet data network gateway entities (PGWs); and
  failure information of user plane paths between the SGWs and the PGWs, and
wherein the selecting, according to the failure information of paths between the SGWs and the neighboring network elements of the SGWs and the acquired signaling plane address list of SGWs serving the UE, an SGW having no failed path to a neighboring network element of the SGW to serve the UE, comprises:
  receiving an S11 interface message sent by the selected SGW after the selected SGW detects that a user plane path to the base station fails, wherein the S11 interface message comprises a failure identifier of the user plane path to the base station; and storing correspondence between information of the base station and a signaling plane address of the selected SGW into the failure information of the user plane paths between the base station and the SGWs; and
  selecting, according to the failure information of the user plane paths between the base station and the SGWs and the acquired signaling plane address list of SGWs serving the UE, an SGW having no failed path to the base station to serve the UE.

2. The method according to claim 1, wherein the selecting, according to the failure information of paths between the SGWs and the neighboring network elements of the SGWs and the acquired signaling plane address list of SGWs serving the UE, an SGW having no failed path to a neighboring network element of the SGW to serve the UE, comprises:
  determining, according to the failure information of the paths between the SGWs and the neighboring network elements of the SGWs, a signaling plane address of each SGW having a failed path to a neighboring network element of the each SGW, in the signaling plane address list of SGWs; and
  removing the signaling plane address of the each SGW having a failed path to a neighboring network element of the each SGW, from the signaling plane address list of SGWs, and then selecting an SGW for the UE according to the signaling plane address list of SGWs.

3. The method according to claim 1, wherein the determining, according to the failure information of the paths between the SGWs and the neighboring network elements of the SGWs, a signaling plane address of each SGW having a failed path to a neighboring network element of the SGW, in the signaling plane address list of SGWs, comprises at least one of the following manners:
  determining, according to the location information of the base station and the failure information of the user plane paths between the base station and the SGWs, a signaling plane address of the each SGW having a failed user plane path to the base station;
  determining, according to a signaling plane address of an acquired PGW and the failure information of the signaling plane paths between the SGWs and the PGWs, a signaling plane address of each SGW having a failed signaling plane path to the acquired PGW;
  determining, according to a user plane address of an acquired PGW and the failure information of the user plane paths between the SGWs and the PGWs, a signaling plane address of each SGW having a failed user plane path to the acquired PGW.

4. A device for selecting a serving gateway entity, wherein the device comprises:
  a receiver, configured to receive an access request message of a user equipment (UE) sent by a base station, wherein the access request message comprises location information of the base station;
  at least one processor, configured to acquire, according to the location information of the base station received by the receiving module, a signaling plane address list of serving gateway entities (SGWs) serving the UE, and
  wherein the at least one processor is further configured to select, according to failure information of paths between the SGWs and neighboring network elements of the SGWs and the signaling plane address list of SGWs serving the UE acquired by the at least one processor, an SGW having no failed path to a neighboring network element of the SGW to serve the UE,
  wherein the failure information of the paths between the SGWs and the neighboring network elements comprises of the SGWs at least one piece of the following information:
    failure information of user plane paths between the base station and the SGWs;
    failure information of signaling plane paths between the SGWs and packet data network gateway entities (PGWs); and
    failure information of user plane paths between the SGWs and the PGWs; and
  a memory, configured to receive an S11 interface message sent by the selected SGW after the selected SGW detects that a user path to the base station fails, wherein the S11 interface message comprises a failure identifier of the user plane path to the base station; and store correspondence between information of the base station and a signaling plane address of the selected SGW into the failure information of the user plane paths between the base station and the SGWs;
  wherein the at least one processor is further configured to select, according to the failure information of the user plane paths between the base station and the SGWs and the acquired signaling plane address list of SGWs serving the UE, an SGW having no failed path to the base station to serve the UE.

5. The device according to claim 4, wherein the
  the at least one processor is further configured to determine, according to the failure information of the paths between the SGWs and the neighboring network elements of the SGWs, a signaling plane address of each SGW having a failed path to a neighboring network element of the each SGW, in the signaling plane address list of SGWs; and
  remove the signaling plane address of the each SGW having a failed path to a neighboring network element of the each SGW, from the signaling plane address list of SGWs, and then selecting an SGW for the UE according to the signaling plane address list of SGWs.

6. The device according to claim 4, wherein the
  the at least one processor is further configured to determine, according to the location information of the base station and the failure information of the user plane paths between the base station and the SGWs, a signaling plane address of each SGW having a failed user plane path to the base station;

or, the at least one processor is further configured to determine, according to a signaling plane address of an acquired PGW and the failure information of the signaling plane paths between the SGWs and the PGWs, a signaling plane address of each SGW having a failed signaling plane path to the acquired PGW;

or, the at least one processor further is configured to determine, according to a user plane address of an acquired PGW and the failure information of the user plane paths between the SGWs and the PGWs, a signaling plane address of each SGW having a failed user plane path to the acquired PGW.

\* \* \* \* \*